United States Patent
Thornton et al.

(10) Patent No.: US 7,197,880 B2
(45) Date of Patent: Apr. 3, 2007

(54) LEAN BLOWOFF DETECTION SENSOR

(75) Inventors: Jimmy Thornton, Morgantown, WV (US); Douglas L. Straub, Morgantown, WV (US); Benjamin T. Chorpening, Morgantown, WV (US); David Huckaby, Morgantown, WV (US)

(73) Assignee: United States Department of Energy, Washington, DC (US)

( * ) Notice: Subject to any disclaimer, the term of this patent is extended or adjusted under 35 U.S.C. 154(b) by 0 days.

(21) Appl. No.: 10/865,037

(22) Filed: Jun. 10, 2004

(65) Prior Publication Data

US 2005/0274116 A1 Dec. 15, 2005

(51) Int. Cl.
*F02C 7/05* (2006.01)
*F02C 7/25* (2006.01)
*F02C 7/047* (2006.01)
*F02C 9/46* (2006.01)

(52) U.S. Cl. .................. 60/779; 60/39.27; 60/39.091
(58) Field of Classification Search ............ 60/779, 60/39.91, 39.091, 39.27
See application file for complete search history.

(56) References Cited

U.S. PATENT DOCUMENTS

| | | | | |
|---|---|---|---|---|
| 5,319,936 A * | 6/1994 | Ikeda et al. | .............. | 60/737 |
| 5,544,478 A * | 8/1996 | Shu et al. | .............. | 60/773 |
| 5,578,828 A * | 11/1996 | Brown et al. | .............. | 250/342 |
| 5,660,043 A * | 8/1997 | Pfefferle et al. | .............. | 60/723 |
| 6,429,020 B1 * | 8/2002 | Thornton et al. | .............. | 436/153 |
| 6,640,548 B2 * | 11/2003 | Brushwood et al. | .............. | 60/776 |
| 6,887,069 B1 | 5/2005 | Thornton et al. | | |
| 2003/0056517 A1 * | 3/2003 | Brushwood et al. | .............. | 60/776 |
| 2004/0107701 A1 * | 6/2004 | Miyake et al. | .............. | 60/772 |
| 2005/0144955 A1 * | 7/2005 | Handelsman et al. | .............. | 60/772 |
| 2006/0042261 A1 * | 3/2006 | Taware et al. | .............. | 60/773 |

OTHER PUBLICATIONS

"In-Situ Flame Ionization Measurements in Lean Premixed Natural Gas Combustion Systems", by Doug Straub, et al., Presented in Western States Section/Combustion Institute Spring Meeting, San Diego, CA, in 2002.
"Detecting Flashback in Premix Combustion Systems", by Jimmy Thornton, et al., American Flame Research Committee (AFRC) International Symposium, Newport Beach, CA, USA, Sep. 2000.
"An In-Situ Monitoring Technique for Control and Diagnostics of Natural Gas Combustion Systems", by Jimmy Thornton, et al., The Second Joint Meeting of the U.S. Sections of the Combustion Institute, Oakland, CA, Mar. 25-28, 2001, pp. 1-9.
"Flame Ionization Sensor Integrated Into Gas Turbine Fuel Nozzle", GT2003-38470, by Jimmy Thornton, et al., Proceedings of 2003 ASME/IGTI TurboExpo Meeting, TurboExpo Power For Land, Sea, and Air, Jun. 16-19, 2003, Atlanta, GA, pp. 1-8.

* cited by examiner

*Primary Examiner*—William H. Rodriguez
(74) *Attorney, Agent, or Firm*—Mark F. LaMarre; Mark P. Dvorscak; Paul A. Gottlieb

(57) ABSTRACT

Apparatus and method for detecting incipient lean blowoff conditions in a lean premixed combustion nozzle of a gas turbine. A sensor near the flame detects the concentration of hydrocarbon ions and/or electrons produced by combustion and the concentration monitored as a function of time are used to indicate incipient lean blowoff conditions.

24 Claims, 10 Drawing Sheets

LEAN BLOWOFF DETECTION SENSOR

CONTRACTUAL ORIGIN OF THE INVENTION

The United States Government has rights in this invention pursuant to Agreement between National Energy Technology Laboratory and pursuant to the employer-employee relationship of the U.S. Department of Energy and the inventors.

FIELD OF THE INVENTION

The present invention relates to a combustion monitoring system in general and in particular to a system for monitoring conditions in the combustion system of a gas turbine to prevent lean blowoff while operating the combustion system at parameters producing low $NO_x$ emissions.

BACKGROUND OF THE INVENTION

Many industrial processes such as power generation, metal smelting and processing, waste incineration and vitrification, glass melting, crude oil refining, petrochemical production, and the like use burners as the primary or as an auxiliary source of energy. These burners have one or more inlets for hydrocarbon based fossil fuels such as natural gas, liquefied petroleum gas, liquid hydrocarbon-based fuel, and the like, which are combusted to produce heat. The fuels are burned in a combustion chamber where the energy that is released by the combustion is transferred in the form of heat for the required purpose. The combustion requires an oxidant, such as air, oxygen-enriched air, or oxygen. In most cases, the oxidant is preheated in order to provide for more efficient combustion.

Precise monitoring and control of the combustion process are very important for the efficient and safe operation of industrial processes. For example, it is well known that burning a fuel with air as the oxidant yields nitrogen oxides ($NO_x$) emissions, especially when the air is preheated. On the other hand, incomplete combustion of a fuel generates carbon monoxide (CO). Both $NO_x$ and CO are dangerous pollutants, and the emission of both gases are regulated.

Stringent environmental emission regulations have motivated changes in the design and operation of combustion processes, in particular gas combustion systems. Many developers of gas combustion systems, such as stationary gas turbines, use some form of lean-premix combustion (LPM). In LPM systems, fuel is mixed with air upstream of the combustion zone at deliberately fuel-lean conditions. A significant reduction of thermal $NO_x$ formation is achieved using LPM system. Research activities by both U.S. Government laboratories and the private sector have been conducted, with specific goals for $NO_x$ emissions of less than 10 ppm. To meet the target $NO_x$ levels, modern premix turbine combustors must operate with a finely controlled fuel/air ratio, (equivalence ratio) near the lean extinction limit. In practice, changes in flow splits caused by manufacturing tolerances or engine wear can compromise emissions performance. Furthermore, unexpected changes in fuel composition, or momentary changes in fuel delivery can lead to problems with flame anchoring.

Serious problems can result when flames reach an extinction limit, or blowout. Operation near the lean extinction limit is desired to reduce $NO_x$ emissions, however this desire must be balanced by the risks of encountering a sudden flame extinction, or lean blowout event. Currently, there are no commercial methods to sense when lean blowout may be incipient.

Due to these issues, there is a growing need to both measure and control the behavior of flames and, in turn, the combustion process in gas turbine combustors. The measurement of combustion parameters when coupled with a combustion control strategy presents numerous unique issues due to the extreme process conditions under which the combustion process occurs.

Numerous systems are available for the measurement of flames in burners, and in particular gas turbines. For example, commercially available UV flame detectors can be used to monitor the status (flame on or off) of a flame. Alternatively, a photocell may be used as the detector. At least one element of the photocell is coated with a sulfide compound, such as cadmium-sulfide or lead-sulfide, so as to be sensitive to the particular wavelengths of light emitted by a flame occurring during a LBO condition. For instance, the electrical resistance of cadmium-sulfide decreases directly with increasing intensity of light, and like lead-sulfide, will function as a variable resistor. However, when used to detect the presence of a flame, a cadmium-sulfide photocell is useful only for sensing that portion of the flame occurring in the visible light wavelengths. Further, these types of flame monitoring devices do not provide information on the combustion product mixture. It may be difficult to determine whether the burner is operated under fuel rich, fuel lean, or stoichiometric (exact amounts of fuel and oxidant to obtain complete combustion of the fuel, equivalence ratio equal to 1) conditions. Further, flame detectors based on the measurement of selected wavelengths of the electromagnetic spectrum are typically self contained devices that are not always integrated in the burner design.

Endoscopes may also often be used within industry to visually inspect flames, and their interaction between the furnace load. They are generally complicated and expensive pieces of equipment that require careful maintenance. To be introduced into very high temperature furnaces or burners, they require external cooling and flushing means: high-pressure compressed air and water are the most common cooling fluids.

When compressed air is used, uncontrolled amounts of air are introduced in the furnace and may contribute to the formation of $NO_x$. Water jackets are subject to corrosion when the furnace atmosphere contains condensable vapors.

Thermocouples and bimetallic elements when used to monitor the combustion process within the fuel nozzles, suffer from the disadvantages of providing only localized point measurements and generally slow reaction times (typically 2 to 3 seconds), which can lead to problems and possible failure of the fuel nozzle before detection. Another disadvantage of these sensors is that, since they only detect heat, they are unable to distinguish between heat generated by the flame of a LBO condition and the heat radiated by the normal combustion process of the gas turbine combustion system.

Additionally, control of the combustion process necessitates ongoing monitoring of the chemical compositions of the fuel, oxidant, and the products of combustion. Due to the extreme environmental conditions a number of problems must be addressed as part of a combustion control system.

Placement of an in-situ oxygen sensor at the burner exhaust can provide a control solution for overall combustion ratio control. However, typical oxygen sensors, such as zirconia-base sensors that are commercially available have limited lifetime and need to be replaced frequently. One difficulty met when using these sensors is a tendency to plug, especially when the exhaust gases contain volatile species or particulates. Further, when more than one burner is utilized, a drawback of global combustion control is that it is not possible to know whether each individual burner is properly adjusted or not. This technique also has long response times due to the diffusion-limited process of transporting oxygen ions through the sensor.

Continuous monitoring carbon monoxide in the flue gas, for example in so-called post combustion control of a burner assembly, provides another means of controlling the combustion. This involves the use of a sophisticated exhaust gas sampling system, with separation of the particulate matter and of the water vapor. Although very efficient, these techniques are not always economically justified.

Also, the light emissions observed from flame is one of the most useful systems for providing information on the chemical, as well as physical processes, as noted hereinabove, that take place in the combustion process. For example, Cusack et al., U.S. Pat. No. 6,071,114 uses a combination of ultraviolet, visible and infrared measurements to characterize the flame to determine relative levels of some chemical constituents. While monitoring the flame light emission can be easily performed in well controlled environments typically found in laboratories, implementing flame light emission monitoring on industrial burners used in large combustion units is quite difficult in practice, resulting in a number of problems. First, clear optical access is necessary which requires positioning of a viewing port in a strategic location with respect to the flame for collecting the flame light emission. Second, the environment is difficult because of excessive heat being produced by the burner. Typically the high temperature-operating environment of the burners necessitates the need for water or gas-cooled probes for use either in or near the burner. Finally, the environment may be dusty which is not favorable for the use of optical equipment except with special precautions, such as gas purging over the optical components.

Control of the combustion process at the burner can be performed by metering the flows of fuel and oxidant, through appropriately regulated valves (electrically or pneumatically driven) that are controlled by a programmable controller (PC). The ratio of oxidant to fuel flow is predetermined using the chemical composition of the fuel and of the oxidant. To be effective, the flow measurements for the fuel and oxidant must be very accurate and readjusted on a regular basis. Typically this situation often leads the operator to use a large excess of air to avoid the formation of CO. Further, typical combustion control strategies do not account for the air intakes that naturally occur in industrial burners that bring in unaccounted quantities of oxidant into the combustion zone, nor does this control scheme account for the variation of the air intakes caused by pressure changes in the burner. Another drawback is that the response time of the feed-forward regulation loop is generally slow, and cannot account for cyclic variations of oxidant supply pressure and composition that occur when the oxidant is not pure oxygen. Other drawbacks of combustion control strategy result from variations due to fuel composition and pressure.

Other combustion control systems use acoustic control of flames. Most of these systems were developed for small combustion chambers in order to avoid extinction of flames, and are triggered by instabilities of flames.

While currently available systems have been able to achieve some degree of control over the combustion in a burner, there is a need for a fast response time monitoring and control system that is durable, and yet requires minimal modification of the burner assembly and the operating parameters of the burner in order to avoid the previously described problems.

Flame Ionization

Volumes of literature describe investigations of electrical conductivity through gases. The electrical properties of flames and the mechanisms for the formation of ions in flames have been studied extensively. The flame ionization detector (FID) commonly used in gas chromatography uses the electrical properties of flames to determine very low concentration of hydrocarbons. Many investigations using hydrocarbon flames suggest that a large portion of the ionization result from "chemical ionization" in the flame front.

Although the mechanism for providing the response is still debated, the FID is considered a carbon counting device. The FID response is proportional to the number of carbon atoms or the concentration of hydrocarbons in the sample. Cheng et al., *The Fast-Response Flame Ionization Detector*, Prog. Energy Combustion Science, vol. 24, 1998, pp. 89–124, described the equation for the current measured in the FID as $$i = r[C_n H_m] Q,$$

where r is the charge per mole of hydrocarbon, $[C_n H_m]$ is the molar concentration of the hydrocarbons, and Q is the volumetric flow rate. The linearity of the FID measurements depends on the consistency of charge collection. This is accomplished mainly by providing consistent inlet bulk flow velocity, providing a constant electric field across the flame, and using a hydrogen flame to ignite the inlet sample and maintain a consistent flame anchor.

Other investigations have shown the feasibility of using flame ionization of monitoring and control of internal combustion (IC) engines. Eriksson et al., *Ionization Current Interpretation for Ignition Control in Internal Combustion Engines*, L. Eriksson, and L. Nielsen, Control Engineering Practice, Vol. 5 (8), 1997, pp. 1107–1113, demonstrated the feasibility of using in cylinder ionization-current measurements to control IC engine spark advance. Watterfall et al., "Visualizing Combustion Using Electrical Impedance Tomography, *Chemical Engineering Science*, vol. 52, Issue 13, Jul., 1997, pp. 2129–2138, demonstrated using impedance tomography to visualize combustion in an IC engine. The results of Waterfall show a linear variation of capacitance with the operating air-to-fuel ratio. The main similarity is the use of a direct-current (DC) electric field to yield a current measurement that relates to the flame parameters.

U.S. Pat. No. 6,429,020 issued Aug. 6, 2002 to Thornton et al., the entire disclosure of which is incorporated herein by reference, describes a Detection Sensor for Lean Premix Fuel Nozzles, which is related to the present invention, but detects different situations and reports different data.

Safety of operation is an essential characteristic expected from all industrial combustion systems. Automated control of the presence of the flame in the combustion can be used to stop the flow of oxidant when the fuel flow is suddenly interrupted.

SUMMARY OF THE INVENTION

It is an object of the present invention to provide a combustion detector for a lean premix combustion system, such that the detector can be readily incorporated into the burner assembly with minimal modification of the burner itself and provide information to determine incipient lean blowoff.

Accordingly, it is an important object of the present invention to provide an apparatus to monitor and control the combustion process in a combustion system to prevent lean blowoff, the apparatus comprising: a combustion system comprising a fuel nozzle in fluid communication with a combustion chamber; a fuel supply in communication with the fuel nozzle; an oxidant supply in communication with the fuel nozzle; means for igniting the fuel and oxidant thereby initiating the combustion process producing hydrocarbon ions and electrons; a sensor in communication with the combustion system and the hydrocarbon ions and/or electrons produced by the combustion process; a control circuit connected to the sensor generating and measuring a signal in response to the concentration of hydrocarbon ions and/or electrons produced by combustion and determining the number of times the concentration of hydrocarbon ions and/or electrons falls below a pre-selected value within a predetermined time interval, or determining the ratio of the standard deviation of the concentration of the hydrocarbon ions and/or electrons to the average concentration of hydrocarbon ions and/or electrons during a predetermined time interval; and mechanism responsive to the control circuit for adjusting the ratio of fuel to oxidant in response to the signal to prevent lean blowoff.

Another object of the present invention is to provide an apparatus to monitor and control the combustion process in a combustion system to prevent lean blowoff, the apparatus comprising: a combustion system comprising a fuel nozzle in fluid communication with a combustion chamber; a fuel supply in communication with the fuel nozzle; an oxidant supply in communication with the fuel nozzle; means for igniting the fuel and oxidant thereby initiating the combustion process producing hydrocarbon ions and/or electrons; an electrode positioned within the combustion system exposed to hydrocarbon ions and/or electrons from the combustion process; a control circuit connected to the electrode generating a current in response to the presence of hydrocarbon ions and/or electrons for measuring current flow in the electrode and hence the concentration of hydrocarbon ions and/or electrons and measuring the number of times the concentration of hydrocarbon ions and/or electrons falls below a pre-selected value within a predetermined time interval, or determining the ratio of the standard deviation of the concentration of the hydrocarbon ions and/or electrons to the average concentration of hydrocarbon ions and/or electrons during a predetermined time interval; and mechanism responsive to the control circuit for adjusting the ratio of fuel to oxidant when the hydrocarbon ions and/or electrons fall below the pre-selected value more than a specified number of times within the predetermined time interval to prevent lean blowoff.

Yet another object of the invention is to provide a method for detecting an incipient lean blowoff condition in a lean premix fuel nozzle of a gas turbine apparatus using a hydrocarbon ion and/or electron sensor and a sensor circuit, the method comprising the steps of: locating the sensor in relation to the combustion chamber of the gas turbine apparatus such that the sensor detects the concentration of hydrocarbon ions and/or electrons produced during combustion of fuel and oxidant in the combustion chamber; monitoring the concentration of hydrocarbon ions and/or electrons as a function of time for the occurrence of incipient lean blowoff conditions and adjusting the ratio of fuel and oxidant in response thereto to prevent lean blowoff.

A final object of the invention is to provide a method for detecting an incipient lean blowoff condition in a lean premix fuel nozzle of a gas turbine apparatus using an electronic detector including an electrode and an electronic detector circuit, the method comprising the steps of: locating the detector proximate the combustion chamber of the gas turbine apparatus such that an electrode is exposed to hydrocarbon ions produced during combustion of fuel and oxidant in the combustion chamber; applying a voltage between the electrode and another electrode and/or ground and monitoring the current in the electrode with the detector circuit, computing the average and standard deviation of the current, computing the normalized standard deviation, define a threshold for the normalized standard deviation that is greater than a predefined threshold for determining the the occurrence of incipient lean blowoff conditions and adjusting the ratio of fuel and oxidant in response thereto to prevent lean blowoff.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 8a is a graphical relationship between the time and the number of events and between the time and the ratio of standard deviation to average current;

FIG. 8b is an enlarged graphical illustration of the area circled in FIG. 8a;

DETAILED DESCRIPTION OF THE PREFERRED EMBODIMENT

In general, the apparatus of the present invention comprises; a combustion system, a means for supplying fuel and an oxidizer, a device for igniting the fuel and oxidizer in order to initiate combustion, and a sensor for determining the concentration of hydrocarbon ions and/or electrons as a function of time. The combustion system comprises a fuel nozzle and an outer shell attached to the combustion nozzle. The outer shell defines a combustion chamber. Preferably the nozzle is a lean premix fuel nozzle.

Fuel and an oxidizer are provided to the combustion nozzle at separate rates. The fuel and oxidizer are ignited thereby initiating the combustion process, which produces a flame. Products of the combustion process include hydrocarbon ions and/or electrons.

A sensor is positioned within the combustion system of the type disclosed in the incorporated U.S. Pat. No. 6,429,020; however, the present invention requires only one electrode, for instance the guard electrode, but two electrodes may also be used. A voltage is applied between the electrode and ground or the second electrode and the resulting current is determined. The device for the measurement of current may be used to determine a change in the magnitude of the current. When the change in the current is several orders of magnitude, such as a relative reduction from 100 to 1, this may indicate the flame has gone out or that the combustion process has stopped. This can be used to determine the presence of a flame within the combustion system.

The sensor may be arranged so that the first electrode is axially centered in the combustion nozzle adjacent to the second end. The second electrode if present may be radially outward of the first electrode or spaced axially from the first electrode in a spaced-apart relationship in order to form a gap, all as previously described.

The fuel and/or oxidizer may be supplied to the combustion nozzle at separate rates and controlled such that the control mechanism is electronically coupled to the mechanism for determining the magnitude of the current between the electrode and ground. The ratio of fuel to oxidant (oxidizer) is controlled in response to detection of incipient lean blowoff, as will be explained.

Figure 1:
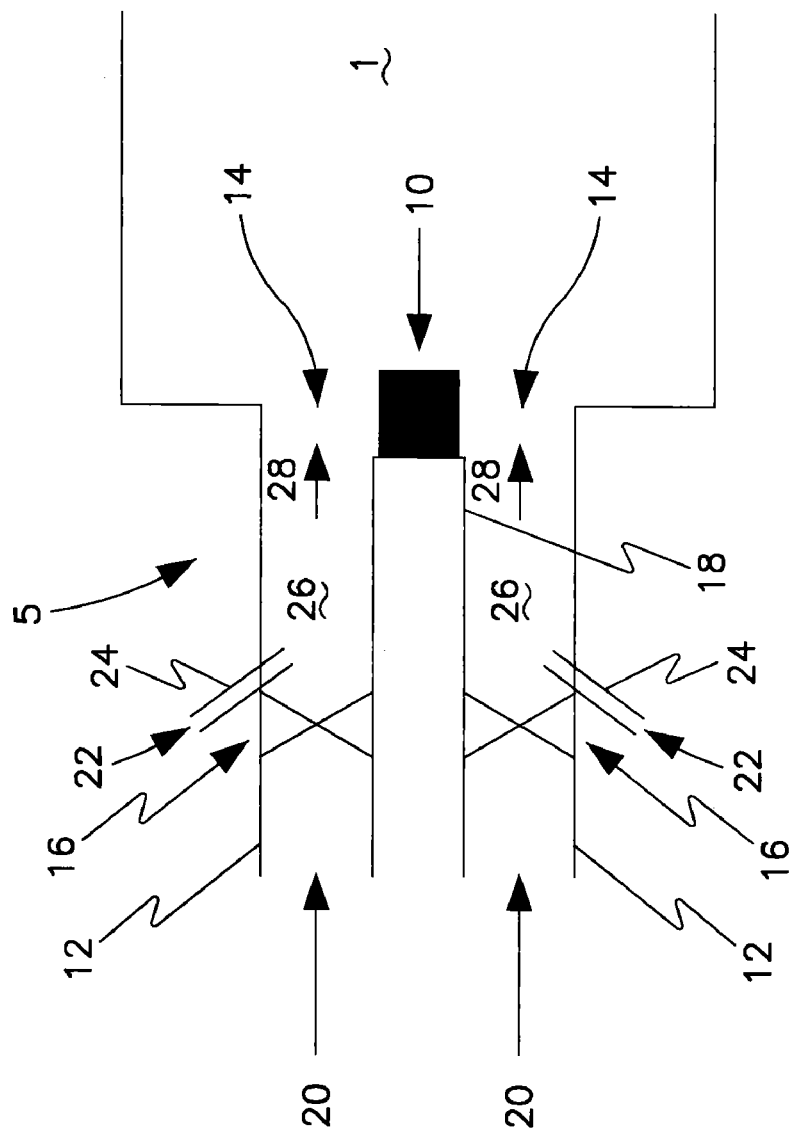
FIG. 1 is an illustration of the present invention situated on the center body of a typical combustion nozzle of a lean premix combustion system.

Referring now to FIG. 1, the sensor of the present invention is denoted by reference numeral 10. Throughout this discussion, the lean blowoff (LBO) sensor 10 may alternatively be referred to as the sensor, the LBO detector or the detector, all of which in either case are meant to refer to the LBO sensor 10 of the present invention. Here is a general overview of the structure and function of the invention as shown in a typical gas turbine combustion system within which the present invention is useful. A typical gas turbine combustion system includes a bladed compressor section, one or more combustion chambers, a turbine section comprising one or more bladed turbines, and a fuel/air delivery system. The compressor and the turbine stages are located on a longitudinally extending, rotatable, central axis. If the gas turbine system uses more than one combustion chamber, the combustion chambers are usually situated in a circular array around the central axis. Each combustion chamber serves as a controlled envelope for efficient burning of the fuel/air mixture delivered into it. The fuel/air delivery system takes pressurized air from the compressor section, mixes the air with fuel and then delivers the fuel/air mixture into the combustion chamber for combustion. The outlet end of each combustion chamber is ducted to the inlet section of the turbine section to direct the gaseous exhaust products of the combustion process to the turbine which will then cause the turbine to rotate. The fuel/air delivery system of a typical gas turbine combustion system comprises a plurality of combustion nozzles located downstream from a fuel/air premixing section. At least one combustion nozzle is provided for each combustion chamber. Ignition of the fuel/air mixture within each combustion chamber is achieved by a flame ignitor. During an LBO condition, the flame momentarily extinguishes followed by auto-ignition. We have disclosed that these events can be detected and the events increase as conditions approach permanent flame-out, a situation to be avoided.

A cross-section drawing of an exemplary combustion nozzle 5 is shown in FIG. 1. This exemplary combustion nozzle having combustion chamber 1 is deemed to be representative of all such lean premix combustion chambers provided on a combustion system equipped with the LBO sensor 10 of the present invention. Discussion of the sensor 10 of the present invention will be made with respect to this exemplary combustion chamber 1, although each combustion chamber incorporated into the gas lean premix system is to be provided with its own LBO sensor 10. Also for simplicity of discussion, the combustion nozzle 5 and combustion chamber 1, are shown with the associated inlets and outlets in FIG. 1, without the various other named parts of a gas combustion system mentioned above.

The combustion nozzle 5 is comprised of conducting material and has an inlet section 12 extending from the oxidizer source (not shown), an outlet port 14 leading into the combustion chamber 1, swirl vanes 16 positioned proximate to the inlet section 12, and a center body 18.

The swirl vanes 16 serve to enhance thorough burning of the fuel/air mixture within the combustion chamber 1 by ensuring that the fuel/air mixture will be completely blended, thereby producing the best possible combustion.

Oxidizer 20 enters through inlet section 12 and fuel 22 enters through fuel inlet 24. Oxidizer 20 and fuel 22 and are mixed in the pre-mix region 26 of the combustion nozzle 5 to form a fuel/air mixture 28. The fuel/air mixture 28 is then injected into the combustion chamber 1 through outlet ports 14.

Figure 2:
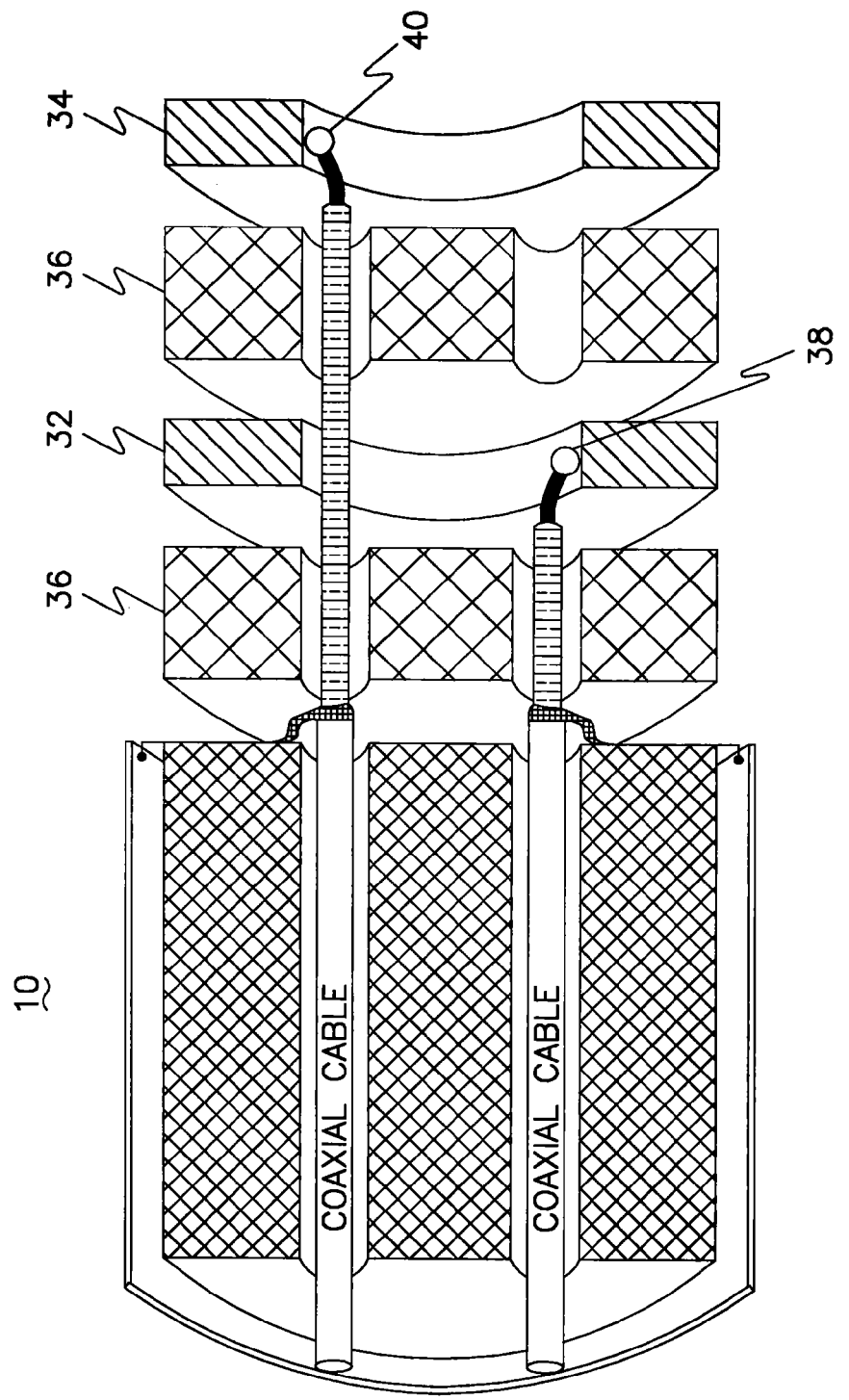
FIG. 2 is a cross-section illustration of an embodiment of the present invention.

The structure of the LBO sensor 10 of the present invention will now be discussed with reference to FIG. 2.

The sensor 10 is preferably made up of three main components, namely a circular electrode 32, a circular electrode 34 and a sensor body 36. The electrode 32 may be substituted by ground so the voltage will be across electrode 34 and electrode 32 or across electrode 34 and ground. The electrodes 32 and 34 are made of an electrically conducting material, such as a metal that is capable of withstanding the normal operating temperatures produced in a combustion system.

The sensor body 36 is also able to withstand both the normal operating temperatures produced during combustion in a gas turbine system. The sensor body 36 preferably has a circular shape with a smooth surface. The electrodes 32, 34 are securely seated in the sensor body 36. The electrodes should be electrically isolated from one another and from the center body 18, yet in such manner that a significant portion of the electrodes 32, 34 are exposed. The electrodes 32, 34 are electrically charged by cables 38, 40. The combustion chamber is typically grounded by plumbing attachments and the entire combustion chamber can serve as another electrode.

The LBO sensor 10 is securely fastened to the nozzle center body 18 within the combustion nozzle 5 in close proximity to the combustion chamber 1. The sensor 10 is oriented on the nozzle center body 18 so as to sufficiently immerse the exposed surfaces of the electrodes 32, 34 near the combustion chamber 1 such that rapid and precise detection of a LBO condition occurring in the combustion chamber 1 can be achieved.

The object of this invention is to specify a sensor and data signal processing apparatus and method for detecting incipient lean blowoff (LBO) using a flame ionization sensor. The embodiment can be similar but is not limited to the CCADS, as disclosed in the following references, each of which is incorporated herein. Straub, D. L. Thornton, J. Chorpening, B. T., Richards, G. A. (2002). *In Situ Flame Ionization Measurements In Lean Premixed Natural Gas Combustion Systems*, presented at the Western States Section/Combustion Institute Spring Meeting, San Diego, Calif., March 25–26; Thornton, J. D. Richards, G. A., and Robey, E. (2000), *Detecting Flashback in Premix Combustion Systems*, presented at the American Flame Research Committee International Symposium, Newport Beach, Calif., September 17–21; Thornton, J. D., Straub, D. L., Richards, G A. Nutter, R. S. Robey, E., (2001), "*An In Situ Monitoring Technique for Control and Diagnostics of Natural Gas Combustion System*" presented at the $2^{nd}$ Joint Meeting of the U.S. Sections of the Combustion Institute, Oakland, Calif., March 25–28; Benson, K., Thornton, J. D., Straub, D. L., Huckaby, E. D., Richards, G. A. (2003), "*Flame Ionization Sensor Integrated Into Gas Turbine Fuel Nozzle*," Presented at ASME/IGTI TurboExpo Meeting, Atlanta, Ga. Jun. 16–19, 2003.

Figure 3:
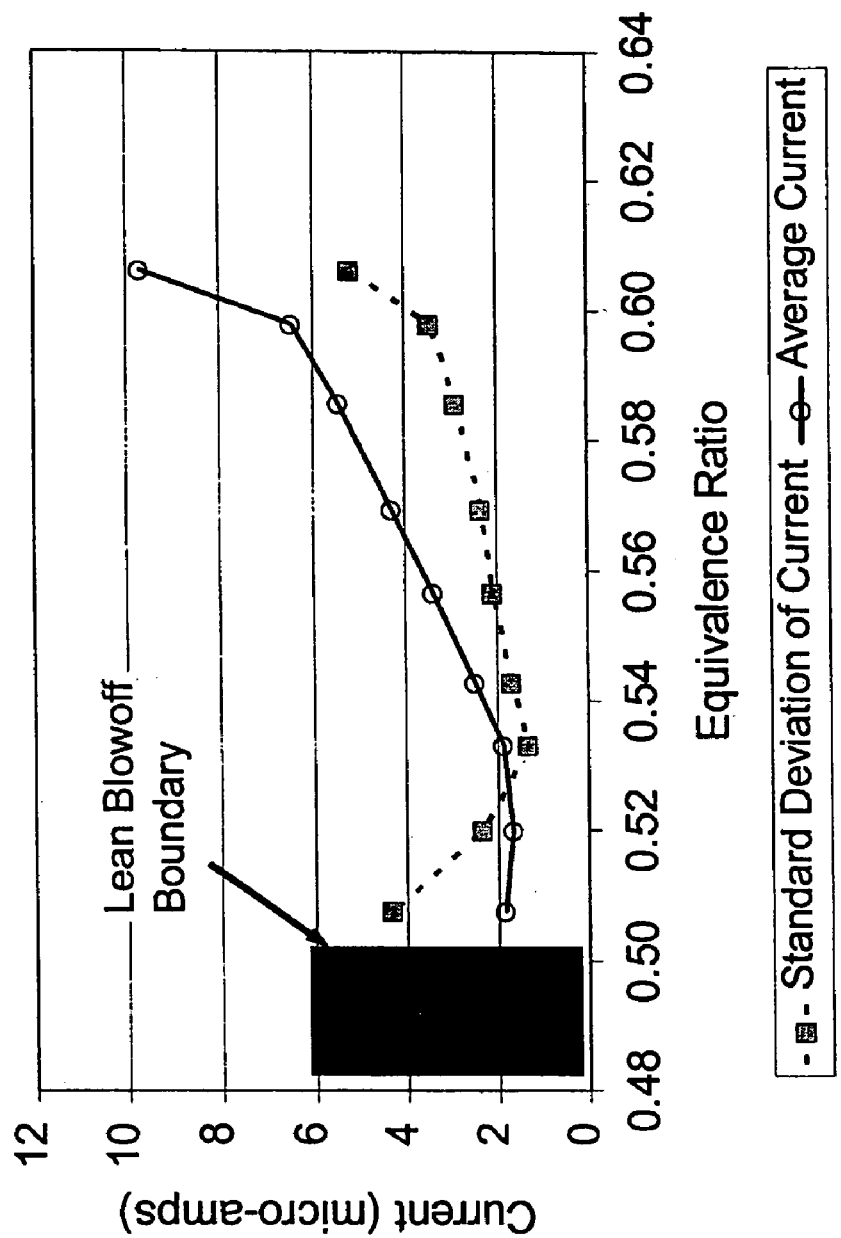
FIG. 3 is a graphical representation of the relationship between the flame ionization current in microamps and the equivalence ratio calculated as both a standard deviation of the current and an average current.
Figure 4:
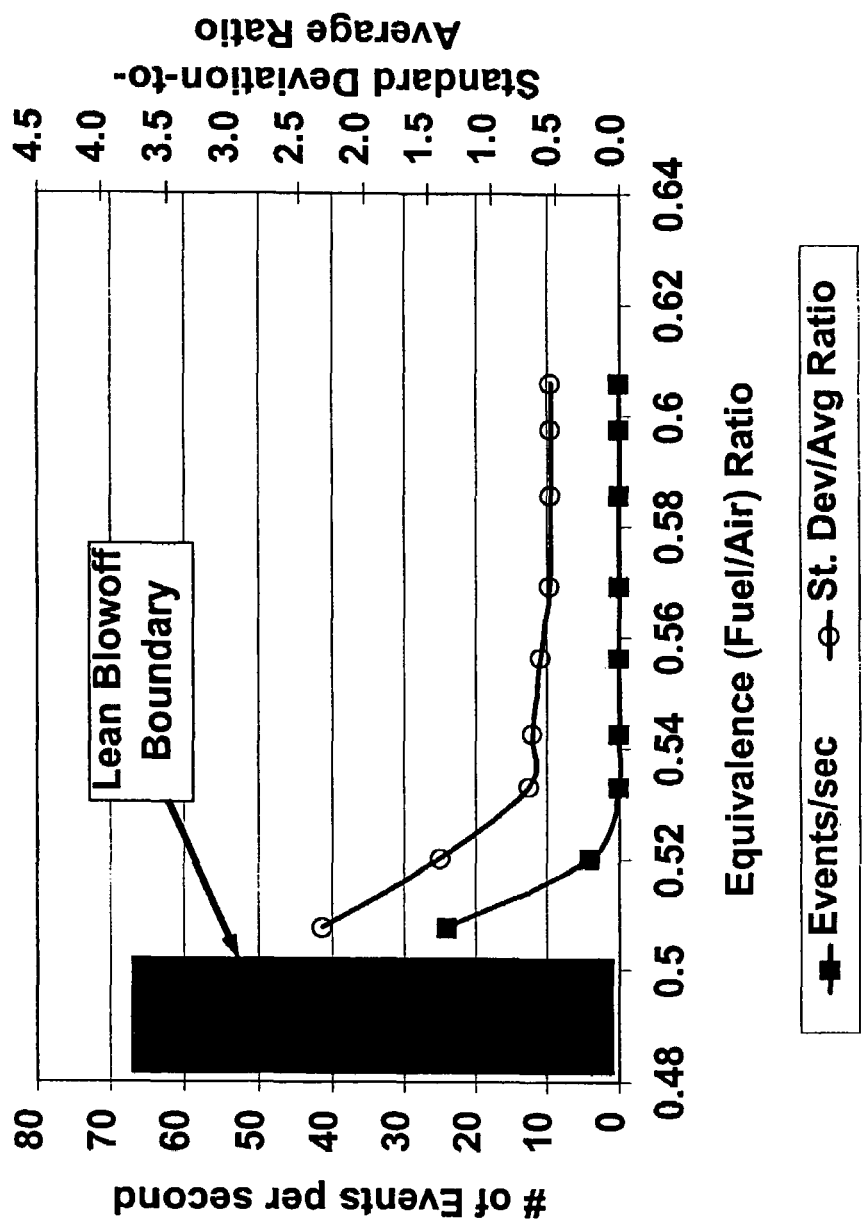
FIG. 4 is a graphical representation of the relationship among the number of incipient lean blowoff events per second, and the ratio of the standard deviation of the flame current to the average current as a function of the equivalence ratio.

LBO detection geometries, as further described in Thornton, J. D., Richards, G. A., Straub, D. L., Liese, E. A., Trader, J. L. Jr., Fasching, G. E., "*Flashback Detection Sensor For Lean Premix Fuel Nozzles*," United State Patent, U.S. Pat. No. 6,429,020 issued 6 Aug. 2002, the disclosures of which are incorporated herein. The most important aspect of the sensor embodiment is that the LBO sensor electrode be at or near the point of flame anchor, and geometrically arranged such that the applied voltage creates an electric field along the axis of the combustor. This can be accomplished in an axial-symmetric step-combustor, which is designed for flame anchor at the step-expansion using the CCADS embodiment illustrated in FIG. 1. The data shown graphically in FIGS. 3–4 represents a series of average current values and standard deviation values computed during an LBO transition test.

Figure 5:
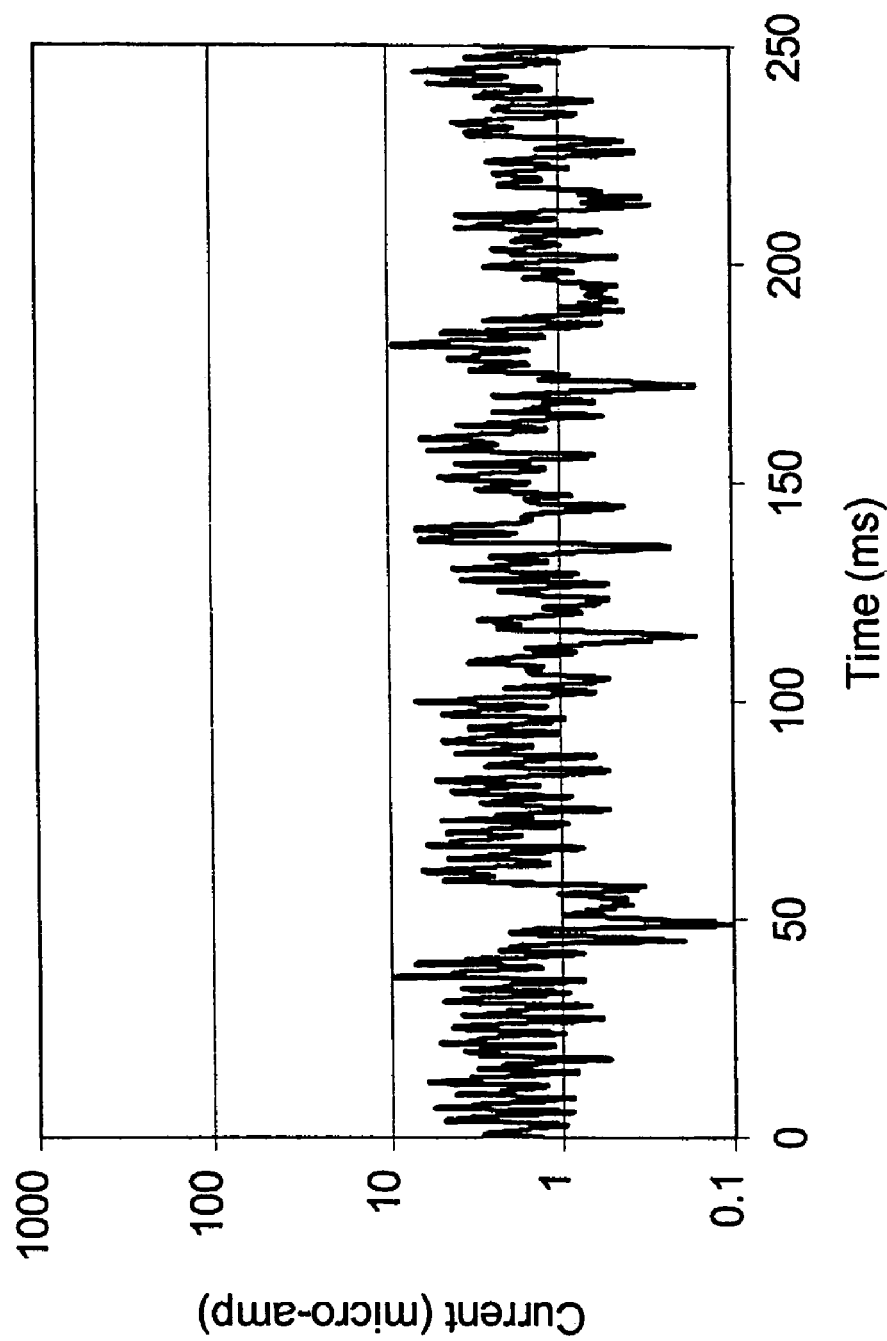
FIG. 5 is a graphical illustration of the relationship between the flame ionization current in microamperes and time at 7 minutes after transition (2.5 minutes before LBO)
Figure 6:
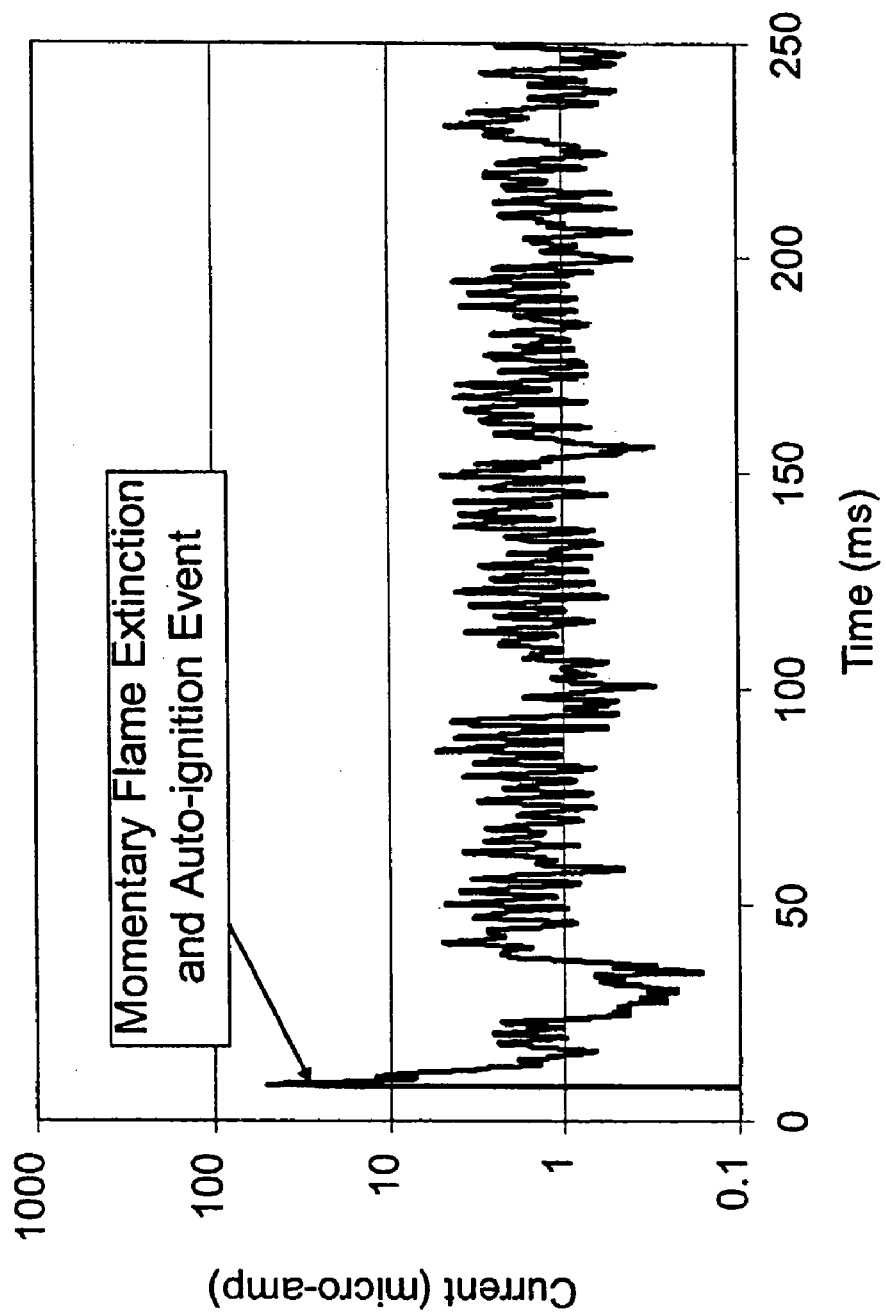
FIG. 6 is a graphical illustration like FIG. 5 for at eight minutes after transition (1.5 minutes before LBO)
Figure 7:
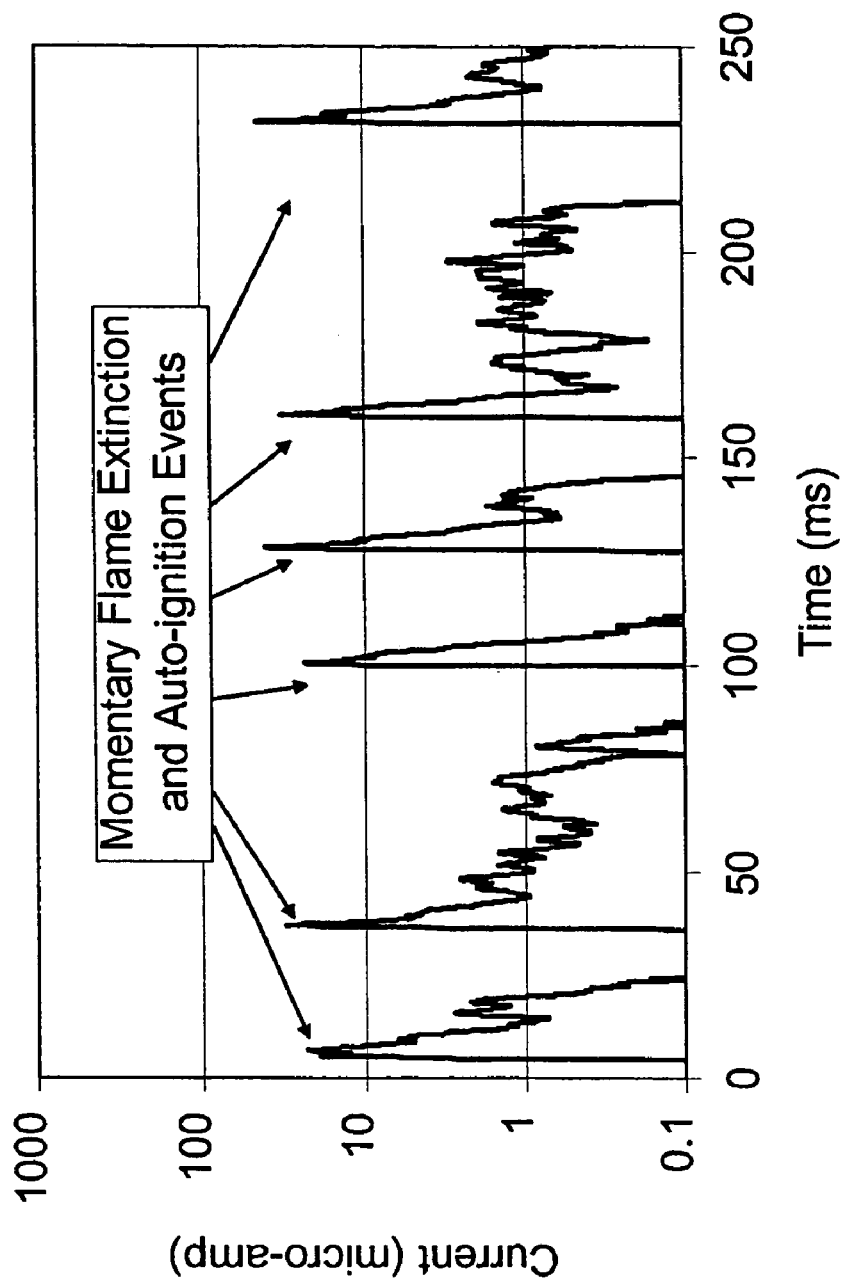
FIG. 7 is a graphical illustration like FIG. 5 at a nine minute interval after transition (0.5 minutes before LBO)

These data were obtained using the CCADS embodiment and the test configuration described in Benson, et al., previously cited. During this LBO test the fuel remained relatively constant and the air was gradually increased until the flame was extinguished. Each of the data points shown in FIGS. 3–4 were computed using a 250 ms continuous time series block of data beginning at the respective time intervals. The data acquisition rate for the time series data was 24 k samples/sec. These data shows that incipient LBO events cause the standard deviation (STD) of the guard signal to increase in magnitude above the magnitude of the average guard signal (from electrode 80). This response is a result of both the sensor location and the flame behavior during a precursor event to LBO. A precursor to LBO is described as a momentary extinction of the flame followed by a sudden re-ignition event. This causes the measured current through the guard electrode 80 to go to zero (flame-out), and sharply increase when the flame ignites again. The result is an increase in the STD of the guard signal above the average. The STD continues to increase as the combustor gets closer to flame-out conditions. The data shown in FIGS. 5–7 inclusively, is a series of three time series plots which were used to compute the average values at 7, 8 and 9 minutes, respectively, along the LBO transition shown in FIGS. 3–4. FIG. 5, at 7 minutes showed that no events occurred. The STD was larger than the AVG at 8 minutes along the LBO transition (FIG. 6) and the time series data contains a single precursor event. FIG. 7 shows the time series data at LBO just before flame extinction. The flame was extinguished at approximately 9 minutes and 30 seconds after beginning the transition.

Figures 8A, 8B:
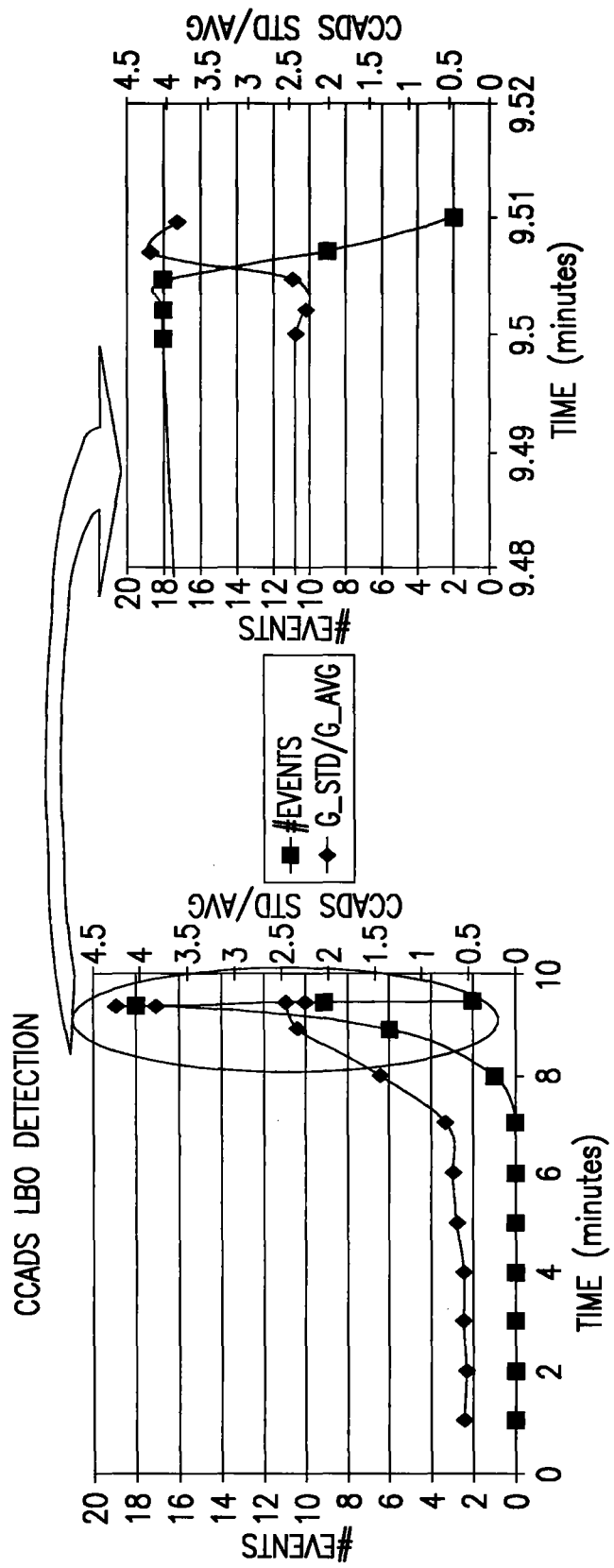

Referring to FIGS. 8A and 8B, therein is shown the relationships of the number of events and the normalized STD (standard deviation divided by the average) as a function of time. Just before permanent flame out, the number of events increases dramatically and thereafter goes to zero. Depending on the geometry of the system, a higher or lower value for the normalized STD can be tolerated, the higher the value of normalized STD the greater the risk of permanent flame out but the leaner the fuel/oxidant ratio (that is the equivalence ratio). The choice of threshold value of the normalized STD is up to the system operators.

Figure 9:
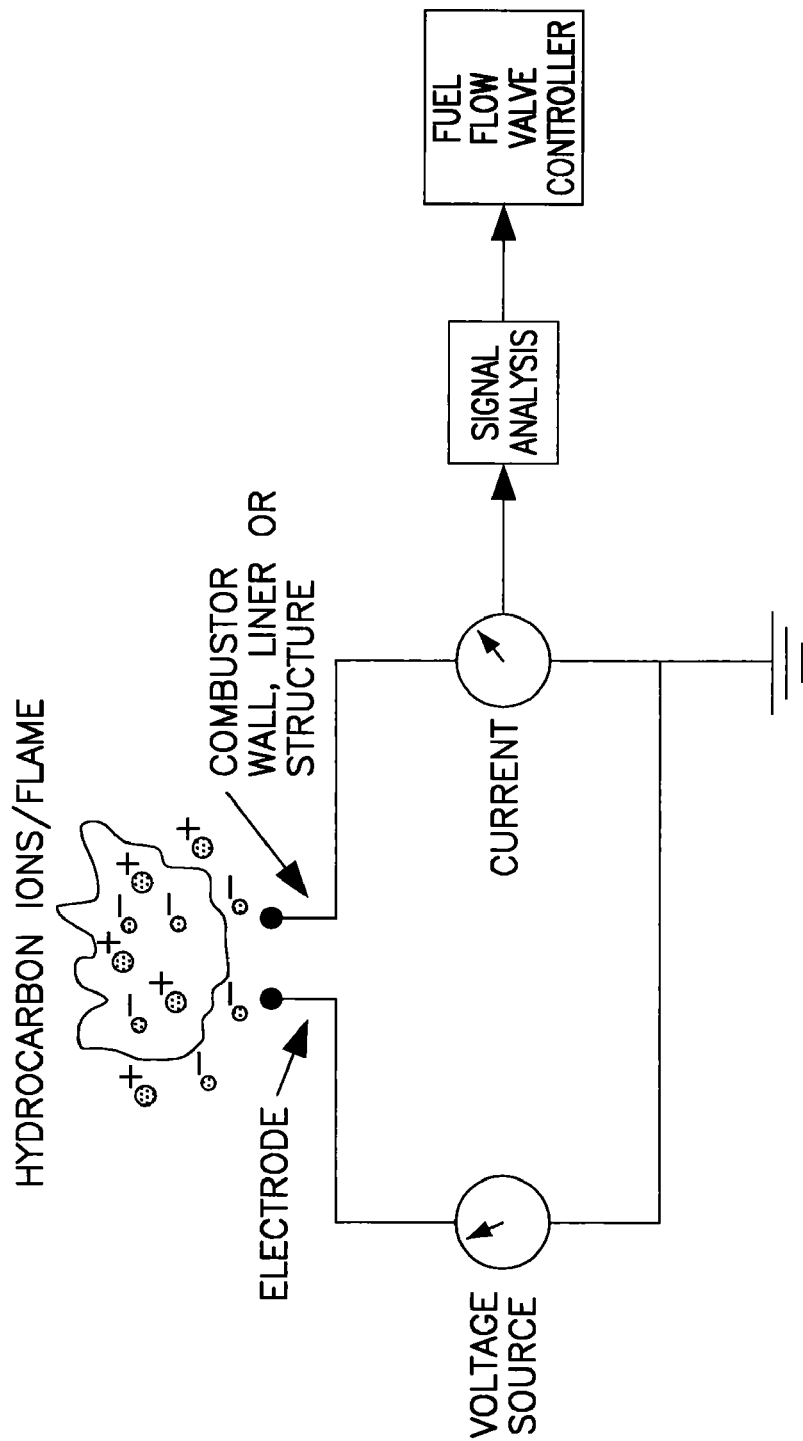
FIG. 9 is a schematic diagram of a control circuit for a lean blowoff detector.
Figure 10:
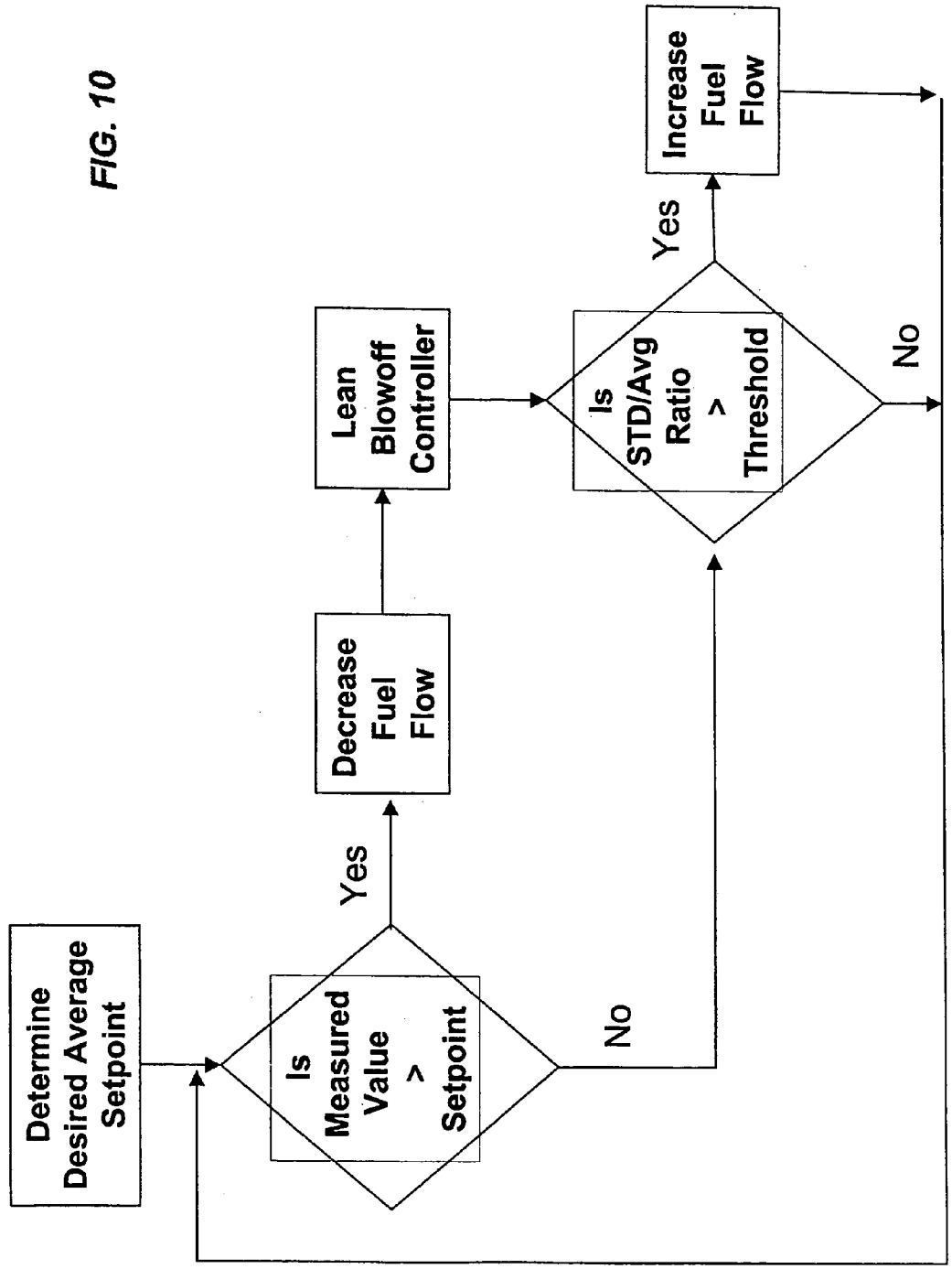
FIG. 10 is a flow diagram of the present invention.

The proposed data signal processing technique for detecting incipient LBO is illustrated in FIGS. 9 and 10:

1. Compute both the average (AVG) and standard deviation (STD) of the flame ionization sensor current measurement. In this example, the CCADS electrode 80 signal is used, and a 250 ms time series data is used.

2. Compute the normalized STD by dividing the STD by the AVG (STD/AVG). This prevents changing operating conditions (i.e. dynamic pressure, $\phi$ (equivalence ratio), etc.) from causing a false indication of LBO, and facilitates establishing a standard threshold for control actions.

3. Define a threshold for the normalized STD of the current {i.e. STD/AVG} that is greater than a predefined threshold 'c', at which point a warning message is generated for the operator and/or automatic control action is taken to prevent LBO.

Once the normalized STD is greater than the threshold 'c', meaning the STD is greater than the average, then the combustor is at incipient LBO. By detecting incipient LBO, the LBO condition can be avoided. The capability of detecting incipient LBO allows operation closer to LBO, which will maximize emission performance.

Other LBO detection techniques have been developed using other sensor technology (i.e. pressure transducers, optical sensors). Nair, S., Lieuwen, T. (2003), "*Acoustic Detection of Imminent Blowoff in Pilot and Swirl Stabilized Combustors*," Proceedings of ASME Turbo Expo 2003, Atlanta, Ga., Jun. 16–19, 2003 and Muruganandam, T. M., Seitzman, J. M., (2003), "*Optical Sensing of Lean Blowout Precursors in a Premixed Swirl Stabilized Dump Combustor*," Proceedings of ASME Turbo Expo 2003, Atlanta, Ga., Jun. 16–19, 2003. The author feels that the CCADS technique is superior to these techniques for the following reason.

1. The optical sensortechnique described in Muruganandam and Seitzman uses event counting to detect LBO. The data shown in FIGS. 8A and 8B clearly shows that the number of events decrease significantly as the combustor gets closer to flame out conditions. Conversely, as also shown in FIGS. 8A and 8B, the normalized STD of the measured guard current continues to increase.

2. The frequency method for detecting LBO uses an increase in the spectral response for frequencies in the range of 0–200 Hz which overlap many combustion systems, normal frequency range for pressure oscillations. This approach could easily result in false indications of LBO.

It is important to reiterate that the LBO detection techniques described above use different sensors. The intent is to point out the data signal processing technique used with these sensor technologies are not the best techniques to use with the flame ionization LBO sensor. The following advantages of the flame ionization LBO detection sensor.

1. Directly measuring current through the flame, so when an incipient LBO condition exists the signal is dramatically affected and easily identifiable, as shown in the data.

2. Requires significantly less complex computations to achieve this superior result. The average and STD of a data signal are widely used and easily implemented both in electronics and in standard control systems.

3. The flame ionization sensor technique does not require penetration of the combustion liner (i.e. can be part of the fuel injector as illustrated in FIG. 1).

A combustion control scheme for local combustion control which reduces or eliminates the amount of combustor tuning and re-tuning necessary for modern turbine operations uses a proportional response to the AVG and normalized STD of the flame ionization signal to control the fuel to each fuel injector, such that the local combustion zone is operated at the lean stability boundary where optimum $NO_x$ reduction occurs.

Both the control circuit of FIG. 9 and the flow diagram of FIG. 10 are representative of various possible control circuits and flow diagrams, all as well understood by one skilled in the art. FIGS. 9 and 10 are not intended to define the limits of the invention but illustrate in an over simplified way an embodiment of the invention.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privileges is claimed are defined as follows:

1. An apparatus to monitor and control the combustion process in a combustion system to prevent lean blowoff, the apparatus comprising: a combustion system comprising a combustion nozzle in fluid communication with a combustion chamber; a fuel supply in communication with said combustion nozzle; an oxidant supply in communication with said combustion nozzle; means for igniting the fuel and oxidant thereby initiating the combustion process producing hydrocarbon ions and electrons; a sensor in communication with said combustion system and the hydrocarbon ions and/or electrons produced by the combustion process; a control circuit connected to said sensor generating and measuring a signal in response to the concentration of hydrocarbon ions and/or electrons within the combustion chamber produced by combustion and determining the number of times the concentration of hydrocarbon ions and/or electrons within the combustion chamber falls below a pre-selected value within a predetermined time interval; and mechanism responsive to said control circuit for adjusting the ratio of fuel to oxidant in response to the signal to prevent lean blowoff.

2. The apparatus of claim 1, wherein said combustion nozzle is a lean premix fuel combustion nozzle.

3. The apparatus of claim 1, wherein the signal is an AC or DC signal.

4. The apparatus of claim 1, wherein the sensor is proximate the flame anchor during combustion.

5. The apparatus of claim 1, wherein the signal is a current and said control circuit measures the average and standard deviation of the current to determine the existence of incipient lean blowoff conditions.

6. The apparatus of claim 5, wherein an increase in the ratio of the standard deviation to the average in a predetermined time interval indicates incipient lean blowoff and said mechanism is operative to increase the ratio of fuel to oxidant in response thereto.

7. The apparatus of claim 1, wherein said control circuit is electronically connected to said mechanism for adjusting the ratio of fuel to oxidant.

8. The apparatus of claim 5, wherein said control circuit is responsive to re-ignition of combustion after combustion momentarily ceases as a function of time.

9. An apparatus to monitor and control the combustion process in a combustion system to prevent lean blowoff, the apparatus comprising: a combustion system comprising a combustion nozzle in fluid communication with a combustion chamber; a fuel supply in communication with said combustion nozzle; an oxidant supply in communication with said combustion nozzle; means for igniting the fuel and oxidant thereby initiating the combustion process producing hydrocarbon ions and/or electrons within the combustion chamber; an electrode positioned within said combustion system exposed to hydrocarbon ions and/or electrons from the combustion process; a control circuit connected to said electrode generating a current in response to the presence of hydrocarbon ions and/or electrons within the combustion chamber for measuring current flow in said electrode and hence the concentration of hydrocarbon ions and/or electrons within the combustion chamber and measuring the number of times the concentration of hydrocarbon ions and/or electrons within the combustion chamber falls below a pre-selected value within a predetermined time interval; and mechanism responsive to said control circuit for adjusting the ratio of fuel to oxidant when the hydrocarbon ions and/or electrons within the combustion chamber fall below the pre-selected value more than a specified number of times within said predetermined time interval to prevent lean blowoff.

10. The apparatus of claim 9, wherein the combustion nozzle is a lean premix fuel combustion nozzle having a longitudinal axis, and wherein the electrode is placed such that voltage applied to said electrode creates an electric field along in the combustion chamber.

11. The apparatus of claim 10, wherein the electrode is proximate the flame during combustion.

12. The apparatus of claim 9, wherein the signal is an AC or DC signal.

13. The apparatus of claim 9, wherein the signal is a current and said control circuit uses the average and standard deviation of the current to determine the existence of incipient lean blowoff conditions.

14. The apparatus of claim 13, wherein an increase in the ratio of the standard deviation to the average in a predetermined time interval indicates incipient lean blowoff and said mechanism is operative to increase the ratio of fuel to oxidant in response thereto.

15. The apparatus of claim 9, wherein said control circuit is electronically connected to said mechanism for adjusting the ratio of fuel to oxidant.

16. The apparatus of claim 15, wherein said control circuit measures the number of times the combustion process is momentarily interrupted and restarted in a predetermined time interval and said mechanism is operative to increase the ratio of fuel to oxidant in response thereto.

17. A method for detecting an incipient lean blowoff condition in a lean premix combustion nozzle of a gas turbine apparatus using a hydrocarbon and/or electron ion sensor and a sensor circuit, the method comprising the steps of: locating the sensor in relation to the combustion chamber of the gas turbine apparatus such that the sensor detects the concentration of hydrocarbon ions and/or electrons produced during combustion of fuel and oxidant in the combustion chamber; monitoring the concentration of hydrocarbon ions and/or electrons as a function of time for the occurrence of incipient lean blowoff conditions and adjusting the ratio of fuel and oxidant in response thereto to prevent lean blowoff.

18. The method of claim 17, wherein incipient lean blowoff conditions are determined by the number of times the concentration of hydrocarbon ions and/or electrons approaches zero in a specified time interval.

19. The method of claim 18, wherein incipient lean blowoff conditions are determined by measuring an electric current through the sensor.

20. The method of claim 17, wherein incipient lean blowoff conditions are determined by the number of times combustion ceases and restarts as a function of time.

21. A method for detecting an incipient lean blowoff condition in a lean premix combustion nozzle of a gas turbine apparatus using an electronic detector including an electrode and an electronic detector circuit, the method comprising the steps of: locating the electronic detector proximate the combustion chamber of the gas turbine apparatus such that the electrode is exposed to hydrocarbon ions and electrons produced during combustion of fuel and oxidant in the combustion chamber; applying a voltage between the electrode and another electrode and/or ground, generating a current and monitoring the current in the electrode with the detector circuit for the occurrence of incipient lean blowoff conditions and adjusting the ratio of fuel and oxidant in response thereto to prevent lean blowoff.

22. The method of claim 21, wherein the current in the electrode substantially increases after combustion momentarily ceases and restarts.

23. The method of claim 22, wherein the number of times substantially increased current occurs after combustion restarts is measured as a function of time to indicate incipient lean blowoff.

24. The method of claim 22, wherein the ratio of the standard deviation of the current to the average level of the current over a predetermined period of time is measured to indicate incipient lean blowoff.

* * * * *